Patented Jan. 25, 1949

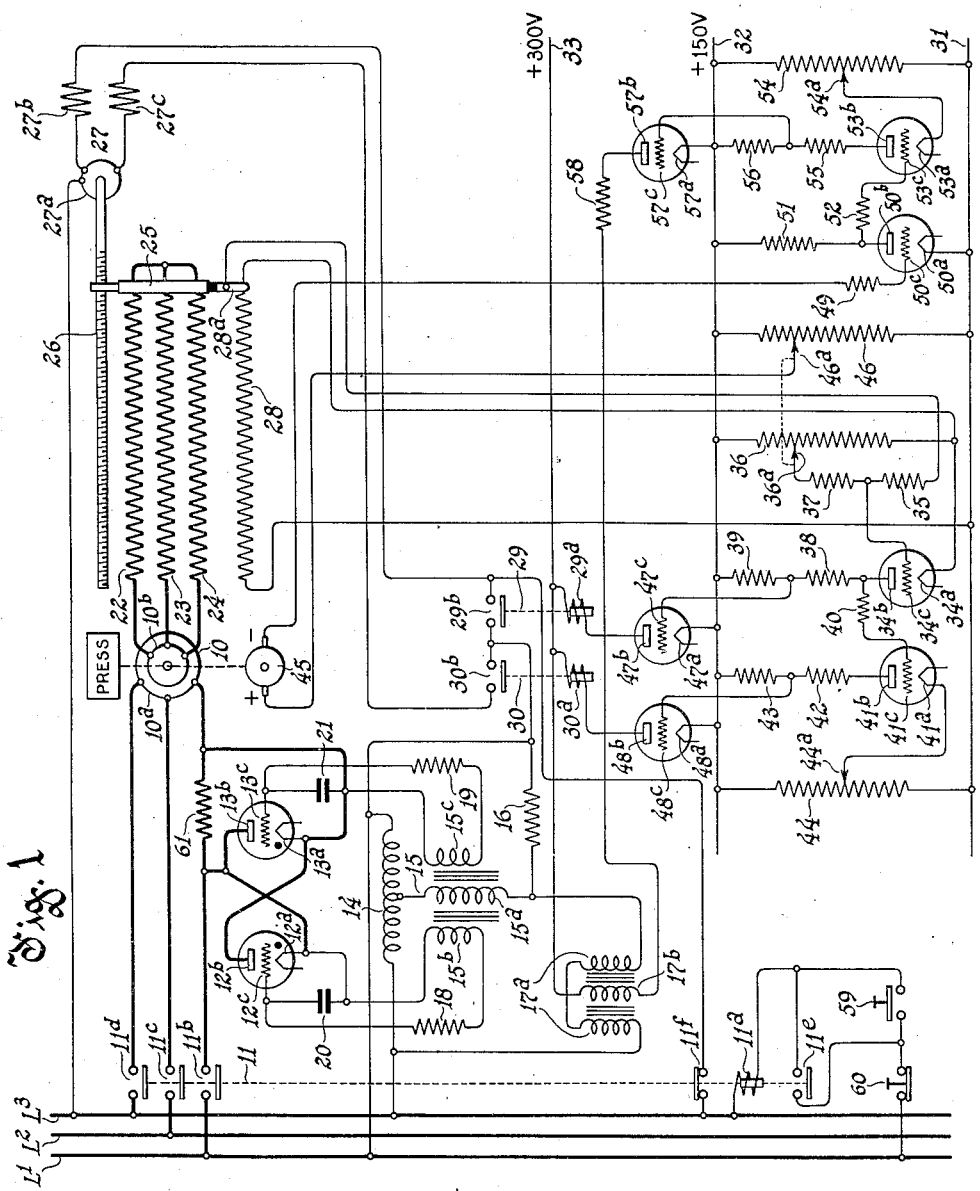

2,460,037

UNITED STATES PATENT OFFICE 2,460,037

COMBINED PRIMARY AND SECONDARY CONTROL OF POLYPHASE MOTORS

Edwin W. Seeger, Wauwatosa, Wis., assignor to Cutler-Hammer, Inc., Milwaukee, Wis., a corporation of Delaware Application October 8, 1945, Serial No. 620,904

6 Claims. (Cl. 318—215)

The invention relates to combined primary and secondary control of polyphase motors and is especially adapted to the automatic speed control of polyphase induction motors of the slip ring type.

The application of Wm. H. Elliot, filed April 9, 1945, Serial No. 587,245, now Patent No. 2,448,256, issued August 31, 1948, discloses a system for controlling the speed of slip ring type induction motors wherein the speed of the motor is varied by varying the effective impedance of a gaseous conduction path inserted in one phase of the primary circuit of the motor. By varying the moment of ignition during the half cycles of the supplied alternating current, the effective current supplied to the motor is varied and with it the effective torque, so that the motor may be operated with a given load at varying speeds, the speed depending upon the moment of ignition of the gaseous conduction device.

In the system disclosed in the aforementioned application, the desired speed of the motor is maintained within a wide speed range by varying the effective impedance of the gaseous conduction path in one of the three primary supply lines without varying the secondary resistance. This means that at all speeds below the maximum speed for a given load and given value of secondary resistance, the motor operates with unbalanced currents. By correlating the amount of secondary resistance with the desired speed through use of an automatically controlled secondary regulator as disclosed in the present application, it is possible to operate the motor over a greater part of the speed range with only slightly unbalanced currents. This is an advantage with respect to both the supply of power to the motor and the efficiency of operation of the latter.

An object of the invention is to provide a controller for a polyphase slip ring driving motor which is operable over a wide range in speed and torque and which responds rapidly to varying torque conditions.

Another object is to provide a controller of the aforementioned type in which the motor circuit is normally adjusted for balanced primary current conditions at maximum speed for any given load, while upon a decrease of the load from that for which adjustment was made, the primary current is automatically unbalanced to maintain the desired speed.

Another object is to provide a speed setting controller of the aforementioned type which affords manual adjustment for the normal operating conditions of the motor supplemented by automatic response to departure from normal conditions, so as to afford maximum operating efficiency over a wide range of adjustment.

Another object is to provide a controller which affords manually adjustable operating speeds for a given range of loads with balanced motor currents and supplemental automatically responsive means for controlling the motor speed with unbalanced currents for loads which are below those afforded by said manually adjustable means.

Other objects and advantages will hereinafter appear.

An embodiment of the invention is illustrated in the accompanying drawing wherein, Figure 1 is a circuit diagram of a proposed motor control system, and Fig. 2 is a diagram showing certain characteristic curves.

Referring to Fig. 1, it shows an induction motor 10 having a three-phase primary winding $10^a$, and a three-phase secondary winding $10^b$. The motor is coupled to a press or the like to drive the same at different speeds. The primary winding $10^a$ is connectible to the bus bars $L^1$, $L^2$ and $L^3$ of a three-phase source of power supply through an electromagnetic switch 11 having an energizing winding $11^a$, normally open main contacts $11^b$, $11^c$ and $11^d$, normally open auxiliary contacts $11^e$ and normally closed auxiliary contacts $11^f$. The contacts $11^c$ and $11^d$ connect the bus bars $L^2$ and $L^3$, respectively, to two terminals of the primary winding $10^a$. The contacts $11^b$ are connected between the bus bar $L^1$ and the cathode $12^a$ of a gaseous electron tube 12, which is also provided with an anode $12^b$ and a control electrode $12^c$. A gaseous tube 13 has an anode $13^b$ which is connected to the cathode $12^a$, a cathode $13^a$ which is connected to the anode $12^b$, and a control electrode $13^c$. Connected across the lines $L^1$ and $L^3$ is a center tapped impedance 14. The center tap of the impedance 14 is connected to one terminal of the primary winding $15^a$ of a transformer 15. The other terminal of said primary winding $15^a$ is connected to one of the end terminals of the impedance 14, through a resistor 16 and is also connected to the other end of the impedance 14, through the windings $17^a$ of a saturable reactor 17, having a winding $17^b$. The transformer 15 is also provided with secondary windings $15^b$ and $15^c$. The winding $15^b$ is connected between the cathode $12^a$ and the control electrode $12^c$ in series with a resistor 18, while the winding $15^c$ is connected between the cathode 13$^a$ and the control electrode 13$^c$ in series with a resistor 19. Fixed condensers 20 and 21, respectively, are connected between the cathode 12$^a$ and the control electrode 12$^c$ and between the cathode 13$^a$ and the control electrode 13$^c$, respectively. The secondary winding 10$^b$ of the motor 10 is connected to three star-connected resistors 22, 23 and 24, respectively, one terminal of each resistor being connected to one terminal each of the secondary winding 10$^b$ while the other terminals of said resistors are connected together to form a neutral point. The amount of resistance inserted in the secondary winding 10$^b$ may be varied by a reciprocating cross-head 25, which makes contact with the resistors 22, 23 and 24 to bridge the same and upon movement to simultaneously vary the amount of resistance which is connected in circuit. The cross-head 25 is threaded to engage a threaded shaft 26 by means of which the cross-head is reciprocated upon rotation of the shaft 26. The shaft is connected to the rotating element of a split phase reversible single phase motor 27, provided with an armature 27$^a$ and reverse windings 27$^b$ and 27$^c$, which are selectively energizable to rotate the motor 27 in one direction or the other to thus reciprocate in opposite directions the cross-head 25 and thereby vary the resistors 22, 23 and 24. The cross-head 25 is also provided with an insulating sliding contact 28$^a$ of a voltage-dividing resistor 28.

The connection of the windings 27$^b$ and 27$^c$ is controlled by a pair of electromagnetic reversing switches 29 and 30, having energizing windings 29$^a$ and 30$^a$, respectively, and normally open contacts 29$^b$ and 30$^b$, respectively. The system also includes a source of direct current energy having the bus bars 31, 32 and 33. The bus bars 32 and 33 are positive with respect to the bus bar 31 at progressively increasing potentials. Thus as indicated in the drawing, the bus bar 32 may have a positive potential of 150 volts and the bus bar 33 a positive potential of 300 volts with respect to the bus bar 31. One terminal of resistor 28 is connected to the bus bar 31, the second terminal of said resistor is connected to the cathode 34$^a$ of an electron tube 34, which also has an anode 34$^b$, and a control electrode 34$^c$. The movable contact 28$^a$ is connected to the control electrode 34$^c$ through a resistor 35. Connected between the cathode 34$^a$ and the bus bar 32 is a voltage-dividing resistor 36, which is the main speed setting resistor and which has a movable contact 36$^a$ connected in series with a resistor 37 to the control electrode 34$^c$. The anode 34$^b$ is connected in series with the series connected resistors 38 and 39 to the bus bar 32. It is also connected through a resistor 40 to the control electrode 41$^c$ of an electron tube 41, which is also provided with a cathode 41$^a$ and an anode 41$^b$. The anode 41$^b$ is connected through series connected resistors 42 and 43 to the bus bar 32. The cathode 41$^a$ is connected to the movable contact 44$^a$ of a voltage-dividing biasing resistor 44, the main terminals of which are connected across the bus bars 31 and 32. Coupled to the shaft of the motor 10 is a direct current tachometer generator 45 whose positive brush is connected to the movable contact 46$^a$ of an auxiliary speed setting potentiometer resistor 46, the main terminals of which are connected between the bus bars 31 and 32. The movable contacts 36$^a$ and 46$^a$ are mechanically coupled with each other so that they may be moved simultaneously for selecting the operating speed of the motor. The common terminal of the resistors 38 and 39 is connected to the control electrode 47$^c$ of an electron tube 47, having also a cathode 47$^a$ and an anode 47$^b$. The cathode 47$^a$ is connected to the bus bar 32, while the anode 47$^b$ is connected in series with the winding 29$^a$ to the bus bar 33. The common terminal of the resistors 42 and 43 is connected to the control electrode 48$^c$ of an electron tube 48, which is also provided with a cathode 48$^a$ connected to the bus bar 32 and with an anode 48$^b$ connected in series with the winding 30$^a$ to the busbar 33. The negative terminal of the tachometer machine 45 is connected through a resistor 49 to the control electrode 50$^c$, of an electron tube 50 which has a cathode 50$^a$ connected to the bus bar 31 and an anode 50$^b$ connected through a resistor 51 to the bus bar 32. The anode 50$^b$ is also connected through a resistor 52, to the control electrode 53$^c$ of an electron tube 53, which is provided with a cathode 53$^a$ connected to the movable contact 54$^a$ of a voltage-dividing resistor 54 whose main terminals are connected across the bus bars 31 and 32. The tube 53 has also an anode 53$^b$ which is connected through the series connected resistors 55 and 56 to the bus bar 32. The common terminal of the resistors 55 and 56 is connected to the control electrode 57$^c$ of an electron tube 57, which is also provided with a cathode 57$^a$ connected to the bus bar 32 and with an anode 57$^b$ connected through a resistor 58 to one terminal of the winding 17$^b$, the other terminal of which is connected to the bus bar 33.

The electromagnetic switch 11 is controlled by a normally open starting push button switch 59 and a normally closed stop push button switch 60. The line L$^1$ is connected through the push button switch 59 and 60, to one terminal of the winding 11$^a$, the other terminal of which is connected to the line L$^3$. Connected in parallel with the push button switch 59 are the normally open contacts 11$^e$.

A circuit also extends from line L$^3$ to one terminal of the armature 27$^a$, current passing from and to the armature winding and alternately through the windings 27$^b$ and 27$^c$. The free terminals of the winding 27$^b$ and 27$^c$, respectively, are connected to one terminal of the contacts 29$^b$ and 30$^b$, respectively, while the other two terminals of said contacts are joined together and are connected to the line L$^1$. A further circuit extends from line L$^3$ through the contacts 11$^f$ to the common terminal of contact 29$^b$ and winding 27$^b$.

A resistor 61 may be connected in parallel with the main discharge paths of the tubes 12 and 13.

The system diagrammatically illustrated in Fig. 1 operates as follows: If the lines L$^1$, L$^2$, L$^3$ are energized and it is desired to start the motor, the push button switch 59 is depressed and a circuit is thereby established from line L$^1$, through switches 60 and 59, the winding 11$^a$ of the electromagnetic switch 11 to line L$^3$. The electromagnetic switch is thereby energized and responds to close the contacts 11$^b$, 11$^c$ and 11$^d$, and thus connect the primary winding 10$^a$ of the motor to the alternating current supply. The tubes 12 and 13 being fully conducting, as will be explained hereafter, the primary current of the motor is substantially balanced. At the same time the contacts 11ᵃ close, thereby paralleling the contacts of push button switch 59, so that the switch 59 may now be released and the winding 11ᵃ remains energized. The cross head 25 being in the extreme right position, the whole of the resistors 22, 23 and 24 is inserted in the secondary circuit of the motor and the motor starts to revolve.

The bus bars 31, 32 and 33, also being energized, current flows through the potentiometer 36 and the potential of the contact 36ᵃ is impressed upon the control electrode 34ᶜ. At the same time current flows through the potentiometer 46 and the positive potential of the contact 46ᵃ is impressed upon the control electrode 50ᶜ to effect control of the impedance of tubes 12 and 13, as will be explained. Also at the same time the potentiometer resistor contact 28ᵃ is in its extreme right position so that the entire resistor 28 is in series with the potentiometer 35 across the bus bars 31, 32. The cathode 34ᵃ is thus at a relatively high positive potential, but the control electrode 34ᶜ is positive with respect to the cathode 34ᵃ, thereby causing a current to flow through the tube 34 and the resistors 38 and 39. The voltage drop through these resistors render the control electrode 47ᶜ negative with respect to its cathode, so that no current flows through the tube 47 and thereby the relay winding 29ᵃ remains deenergized. The potential of the anode 34ᵇ is also impressed on the control electrode 41ᶜ. The adjustment of the contact 44ᵃ is such that the control electrode 41ᶜ is negative with respect to the cathode 41ᵃ. If the motor is to operate at a speed higher than the minimum speed afforded by the full value of the resistors 22, 23, 24 the potential of the control electrode 41ᶜ is such with respect to the cathode 41ᵃ that the tube 41 remains nonconducting, thereby producing no voltage drop in the resistors 42, 43, and the voltage of the bus bars 32 is impressed on the control electrode 48ᶜ. The tube 48 thus is conducting and its current energizes the relay 30 to close the contacts 30ᵇ, thereby establishing a circuit from line L³, through the motor armature 27ᵃ, the winding 27ᶜ, through contacts 30ᵇ to line L¹. The motor 27 thus revolves to move the cross head 25 to the left, thereby cutting out part of the resistors 22, 23 and 24, to cause the speed to increase. The movement of the cross head also reduces the positive potentials of the contact 28ᵃ. This reduces the positive potential impressed on the grid 34ᶜ which in turn increases the potential on the grid 41ᶜ, increasing the current passing through the tube 41 to thereby in turn decrease the potential on the grid 48ᶜ and finally decreases the energization of the winding 30ᵃ. The cross head continues to move to a point where the potential of the movable contact 28ᵃ corresponds to the desired speed and to the potential for which the the movable contact 36ᵃ is set, whereupon the current flow through the tube 48 is insufficient to maintain energization of the winding 30ᵃ at a value which will keep the contact 30ᵇ closed. Said contact upon opening deenergizes the motor 27 and thereby prevents further reduction of the resistances in the secondary circuit of the motor and the motor will operate at the speed determined by the setting of the contacts 36ᵃ, while the tubes 12 and 13 are fully conducting.

The positive potential of the contact 46ᵃ, which is impressed upon the control electrode 50ᶜ, tends to render the tube 50 conducting. Said positive potential is opposed by the negative potential of the tachometer generator 45. It is apparent that at standstill the control electrode 50ᶜ is positive with respect to the cathode 50ᵃ, as no countervoltage is then induced in the tachometer 45.

The potential of the cathode 50ᵃ is impressed through the resistor 52 on the control electrode 53ᶜ and the potential of said control electrode with respect to the cathode 53ᵃ is determined by adjustment of the movable contact 54ᵃ of the voltage divider 54 connected between the bus bar 31 and 32. If the potential of the control electrode 53ᶜ is sufficiently negative with respect to the cathode 53ᵃ, no current passes through the tube 53, no voltage drop exists in the resistors 55 and 56 and the control electrode 57ᶜ thereupon assumes approximately the potential of bus bar 32 and that of cathode 57ᵃ and a current flows through said tube into energizing winding 17ᵇ. With the winding 17ᵇ energized, the impedance of the winding 17ᵃ is a minimum and under these conditions the voltage in the winding 15ᵃ and the corresponding voltages in the winding 15ᵇ and 15ᶜ are substantially in phase with the voltage impressed upon the main electrodes of the tubes 12 and 13, so that the tubes 12 and 13 become fully conducting during the corresponding positive half cycles and their impedance is substantially negligible so that the motor primary current is substantially balanced. The current supplied through tubes 12 and 13 to the motor is supplemented by the current through the resistor 61 if same is employed, such current depending on the value of said resistor.

If under the aforediscussed conditions the load of the motor should be slightly lower than the full load torque for which the speed setting potentiometers 36 and 46 are set, the speed of the motor would tend to rise above the desired value. Such a speed increase would cause the tachometer generator 45 to produce a greater voltage thereby making grid 50ᶜ more negative, grid 53ᶜ more positive, grid 57ᶜ more negative and causing a decrease in the current through winding 17ᵇ which in turn causes an increase in the effective impedance of tubes 12 and 13. The decrease in current through said tubes decreases the torque of the motor and causes the speed to return to the value preset by the adjustment of potentiometers 36 and 46.

If subsequently the load increases and the speed of the motor tends to decrease, the action just described is reversed and the tubes 12 and 13 supply a higher effective current to restore the speed of the motor. This correcting action will take place up to the point that the tubes become fully conducting. With increase in load beyond this point, the speed of the motor will follow the normal speed-torque curve for the motor operating with practically balanced primary voltages and the existing amount of secondary resistance.

If it is desired to operate the motor at a lower speed, the contacts 36 and 46 are moved downwardly, thereby decreasing the conductivity of tube 34 resulting in an increase of the conductivity of tube 47 to a value which energizes relay coil 29ᵃ. The relay 29 thereupon closes contacts 29ᵇ, thereby energizing the motor 27, the current flowing through the winding 27ᵇ to rotate the motor in a direction to increase the ohmic value of the resistors 22, 23 and 24, which reduces the motor current and the motor speed. At the same time the contact 28ᵃ moves toward the right, thus causing an increase in the potential of grid 34ᶜ and a decrease of the current of tube 34, which as previously explained gradually reduces the current supplied to the relay 29 to a value at which it opens contacts 29ᵇ and stops the motor 27 when the motor speed corresponds to the setting of the speed setting contact 36ᵃ.

The regulation of the tubes 12 and 13 during the period just described is as will be apparent such that the primary current through said tubes is less than maximum, as the voltage of generator 45 during the deceleration period exceeds that provided by the contact 46ᵃ, thus retarding the grid voltage of tube 12 and 13 relative to the main voltage.

The motor speed is thus controlled by a combination of secondary and primary current regulation. The accompanying diagram (Fig. 2) illustrates the speed torque characteristic of the motor as varied by the present control system. The curve A represents the speed torque relation of the motor with the secondary winding short circuited. The curve B represents the speed torque relation of the motor with all of the secondary resistance inserted in the secondary circuit. The curve C represents the speed torque curve of the motor with the secondary resistance at an intermediate value between maximum and minimum. All three curves A, B and C are for the motor with the primary current balanced in all three phases, that is, with the effective impedance of the discharge tubes 12 and 13 in the primary circuit substantially zero. Supposing now that the contact 46ᵃ were set to maintain the speed $S_1$ with a motor torque $T_1$: With the primary circuit balanced, that is, the tubes 12 and 13 fully conducting, the motor characteristic is represented by the curve C. If now the torque imposed upon the motor should decrease to the value $T_2$ without change of the secondary resistance and with the tube in the primary circuit fully conducting, the motor speed would rise to the value $S_2$. However, upon the tendency of the motor speed to increase, the tachometer voltage tends to increase correspondingly and this as aforedescribed decreases the conductivity of the tubes 12 and 13, thereby unbalancing the primary motor circuit and maintaining the desired speed $S_1$ as indicated in the diagram.

It will be obvious that if with the resistor 61 omitted, the load imposed upon the motor is very much below the torque afforded by the motor for balanced operating conditions, the conductivity of the tubes 12 and 13 will ultimately be reduced to zero so that without the use of the resistor 61 the motor will operate single phase. The speed torque curve for single phase primary current supply corresponding to short circuited rotor conditions is represented by the curve $D_a$, while the curves $D_b$ and $D_c$ show the single phase speed torque characteristics corresponding to the balanced speed torque characteristics B and C, respectively. It will be obvious that for any speed torques lying in the areas between the speed torque curve $D_a$, $D_b$ and $D_c$, respectively, and the ordinates of the diagram, the operation of the motor is unstable.

I claim:

1. A method of controlling a polyphase slip ring motor having polyphase connections between its primary terminals and a polyphase supply circuit, the conductivity of the connection of one primary terminal to the supply circuit being regulable by an electronic discharge in circuit with one primary terminal, which comprises the step of adjusting the impedance of the secondary circuit of the motor for obtaining with balanced polyphase conditions at the primary terminals of the motor substantially any desired speed between synchronous and zero speeds of the motor under a given maximum load at said speed and the step of compensating for departure from said desired speed by regulating the aforementioned electronic discharge to afford varying unbalanced conditions at the terminals of the motor in a stepless manner and through a range which may be extended from substantially balanced polyphase conditions to a single phase condition for the motor primary, thereby to compensate for tendency of the motor upon load variations within a given range of said load, to depart from said desired speed.

2. In a printing press control system or the like, in combination, a source of polyphase current, a polyphase motor having its primary supplied from said source, means to vary the impedance of the secondary circuit of said motor, means for supplying a voltage varying in accordance with said impedance, manual speed selecting means presettable for a given speed of said motor under given load conditions, means sensitive to said voltage and the setting of said speed selecting means for controlling said impedance varying means to afford motor speed control under balanced polyphase conditions of the primary of said motor, regulable space discharge means interposed between said source and one of the primary terminals of said motor, and means sensitive to the setting of said speed selecting means and effecting varying regulation of said space discharge means according to tendency of said motor to depart from said given speed upon reduction of said load, thereby through potential regulation of a single terminal of the motor primary winding affording a range of supplemental control which may extend from substantially balanced conditions to a single phase condition of the primary of said motor, to maintain said given speed of said motor.

3. In a printing press control system or the like, in combination, a source of polyphase current, a polyphase motor having its primary supplied from said source, means to vary the impedance of the secondary circuit of said motor, means for supplying a voltage varying in accordance with said impedance, means responsive to the speed of said motor, manual speed selecting means presettable for a given speed of said motor under given load conditions, means sensitive to said voltage and the setting of said speed selecting means for controlling said impedance varying means to afford motor speed control under balanced polyphase conditions of the primary of said motor, regulable space discharge means interposed between said source and one of the primary terminals of said motor, and means sensitive to the setting of said speed selecting means and to said speed responsive means and effecting varying regulation of said space discharge means according to tendency of said motor to depart from said given speed upon reduction of said load, thereby through potential regulation of a single terminal of the motor primary winding affording a range of supplemental control which may extend from substantially balanced conditions to a single phase condition of the primary of said motor, to maintain said given speed of said motor.

4. In a printing press control system or the like, in combination, a source of polyphase current, a polyphase motor having its primary supplied from said source, means to vary the impedance of the secondary circuit of said motor, means for supplying a voltage varying in accordance with said impedance, means responsive to the speed of said motor, manual speed selecting means presettable for a given speed of said motor under given load conditions, means sensitive to said voltage and the setting of said speed selecting means for controlling said impedance varying means to afford motor speed control under balanced polyphase conditions of the primary of said motor, a space discharge device having its main discharge path interposed between said source and one of the primary terminals of said motor and having a control element, means to impress upon said control element an alternating potential of the frequency of said polyphase current for controlling the impedance of said device, and means sensitive to the setting of said speed selecting means and said speed responsive means and effecting varying regulation of said space discharge device through control of said alternating potential according to tendency of said motor to depart from said given speed upon reduction of said load, thereby through potential regulation of a single terminal of the motor primary winding affording a range of supplemental control which may extend from substantially balanced conditions to a single phase condition of the primary of said motor, to maintain said given speed of said motor.

5. In a printing press control system or the like, in combination, a source of polyphase current, a polyphase motor having its primary supplied from said source, means to vary the impedance of the secondary circuit of said motor, means for supplying a voltage varying in accordance with said impedance, means responsive to the speed of said motor, manual speed selecting means presettable for a given speed of said motor under given load conditions, means sensitive to said voltage and the setting of said speed selecting means for controlling said impedance varying means to afford motor speed control under balanced polyphase conditions of the primary of said motor, a space discharge device having its main discharge path interposed between said source and one of the primary terminals of said motor and having a control element, means to impress upon said control element an alternating potential of the frequency of said polyphase current for controlling the impedance of said device, and means including electronic means and sensitive to the setting of said speed selecting means and to said speed responsive means and effecting varying regulation of said space discharge means through control of said alternating potential according to tendency of said motor to depart from said given speed upon reduction of said load, thereby through potential regulation of a single terminal of the motor primary winding affording a range of supplemental control which may extend from substantially balanced conditions to a single phase condition of the primary of said motor, to maintain said given speed of said motor.

6. In a printing press control system or the like, in combination, a source of polyphase current, a polyphase motor having its primary supplied from said source, means to vary the impedance of the secondary circuit of said motor, means for supplying a voltage varying in accordance with said impedance, manual means for varying the relations between said voltage and said impedance, means responsive to the speed of said motor, manual means for varying the response of said speed responsive means, manual speed selecting means presettable for a given speed of said motor under given load conditions, means sensitive to said voltage and the setting of said speed selecting means for controlling said impedance varying means to afford motor speed control under balanced polyphase conditions of the primary of said motor, a space discharge device having its main discharge path interposed between said source and one of the primary terminals of said motor and having a control element, means to impress upon said control element an alternating potential of the frequency of said polyphase current for controlling the impedance of said device, means including electronic means and sensitive to the setting of said speed selecting means and said speed responsive means and effecting varying regulation of said space discharge means through control of said alternating potential according to tendency of said motor to depart from said given speed upon reduction of said load, thereby through potential regulation of a single terminal of the motor primary winding affording a range of supplemental control which may extend from substantially balanced conditions to a single phase condition of the primary of said motor to maintain said given speed of said motor.

EDWIN W. SEEGER.

REFERENCES CITED

The following references are of record in the file of this patent:

UNITED STATES PATENTS

| Number | Name | Date |
|---|---|---|
| 1,376,453 | Meyer | May 3, 1921 |
| 1,914,350 | Evans | June 13, 1933 |
| 2,102,911 | Perry | Dec. 21, 1937 |
| 2,351,759 | Grundmann | June 20, 1944 |
| 2,386,580 | Wickerham | Oct. 9, 1945 |